(12) United States Patent
Vaccaro, II

(10) Patent No.: US 8,978,587 B2
(45) Date of Patent: Mar. 17, 2015

(54) AUTO-FRESHENING WATER DISPENSER

(76) Inventor: Edward Anthony Vaccaro, II, Lafayette, CA (US)

( * ) Notice: Subject to any disclaimer, the term of this patent is extended or adjusted under 35 U.S.C. 154(b) by 0 days.

(21) Appl. No.: 13/592,189

(22) Filed: Aug. 22, 2012

(65) Prior Publication Data

US 2014/0053782 A1 Feb. 27, 2014

(51) Int. Cl.
*A01K 7/00* (2006.01)
*A01K 7/02* (2006.01)

(52) U.S. Cl.
CPC ......................................... *A01K 7/02* (2013.01)
USPC .......................................................... 119/74

(58) Field of Classification Search
USPC .............. 119/69.5, 72–81; 239/20, 17, 16, 22
See application file for complete search history.

(56) References Cited

U.S. PATENT DOCUMENTS

| | | | |
|---|---|---|---|
| 3,337,133 A * | 8/1967 | Duerkob ......................... | 239/18 |
| 3,894,689 A * | 7/1975 | Billingsley ..................... | 239/18 |
| 5,582,132 A | 12/1996 | Morton | |
| 6,202,594 B1 | 3/2001 | Kirschner | |
| 6,279,508 B1 | 8/2001 | Marchant et al. | |
| 6,634,316 B2 * | 10/2003 | Desatoff ...................... | 119/69.5 |
| 6,647,922 B1 * | 11/2003 | Travis ........................... | 119/69.5 |
| 7,011,041 B1 * | 3/2006 | Bradley ........................ | 119/69.5 |
| 7,677,200 B2 | 3/2010 | Lytle | |
| 7,997,229 B2 | 8/2011 | Saborio et al. | |
| 8,104,431 B2 | 1/2012 | Klenotiz | |
| 8,381,685 B2 * | 2/2013 | Lipscomb et al. .............. | 119/74 |
| 2003/0075113 A1 * | 4/2003 | Desatoff ....................... | 119/69.5 |
| 2003/0101942 A1 * | 6/2003 | Reusche ....................... | 119/69.5 |
| 2003/0213437 A1 * | 11/2003 | Norris .............................. | 119/74 |
| 2006/0249224 A1 | 11/2006 | Ury | |
| 2009/0277392 A1 * | 11/2009 | Potter ........................... | 119/69.5 |
| 2010/0089332 A1 * | 4/2010 | Dye et al. ...................... | 119/69.5 |
| 2011/0174226 A1 * | 7/2011 | Huber ........................... | 119/69.5 |
| 2013/0019809 A1 * | 1/2013 | McCallum et al. ............. | 119/75 |

* cited by examiner

*Primary Examiner* — Trinh Nguyen
(74) *Attorney, Agent, or Firm* — Vierra Magen Marcus LLP

(57) ABSTRACT

An automatic freshening water dispenser includes a bottom and is defined by a sidewall engaging the bottom and rising to a top edge. The sidewall having a first height between the bottom and the top edge and includes a recessed portion having a lower height. Three water inputs are positioned in the bowl Two water inputs positioned adjacent to the bottom of the bowl to eject water in a direction away from the recessed portion. A third water input is positioned in the sidewall at a location in the bowl opposing the recessed portion to eject water in a direction toward the recessed portion. A conduit couples the first, second and third water inputs to a water source connection.

17 Claims, 6 Drawing Sheets

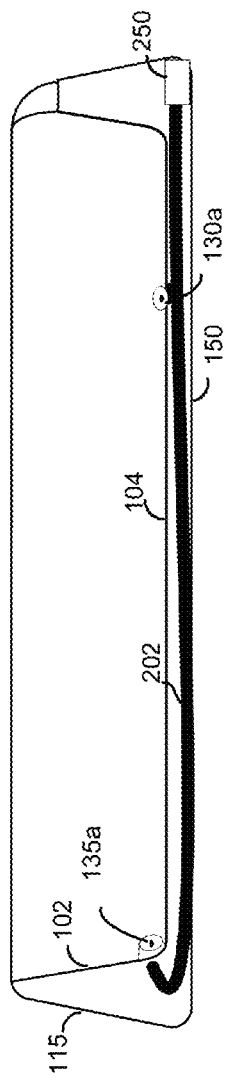
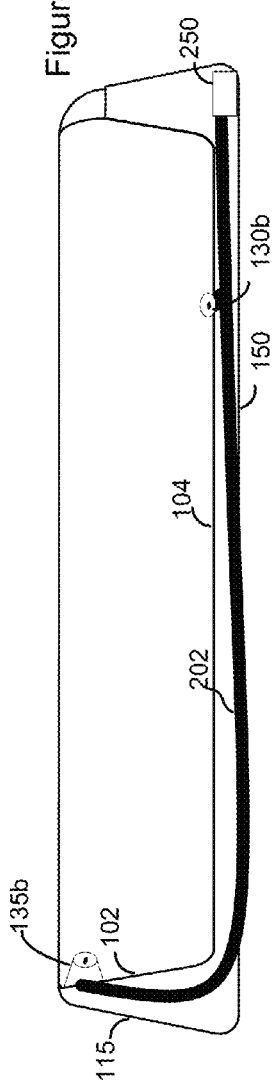
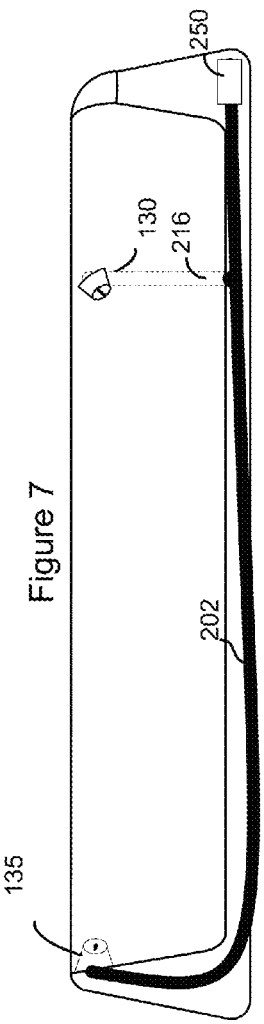

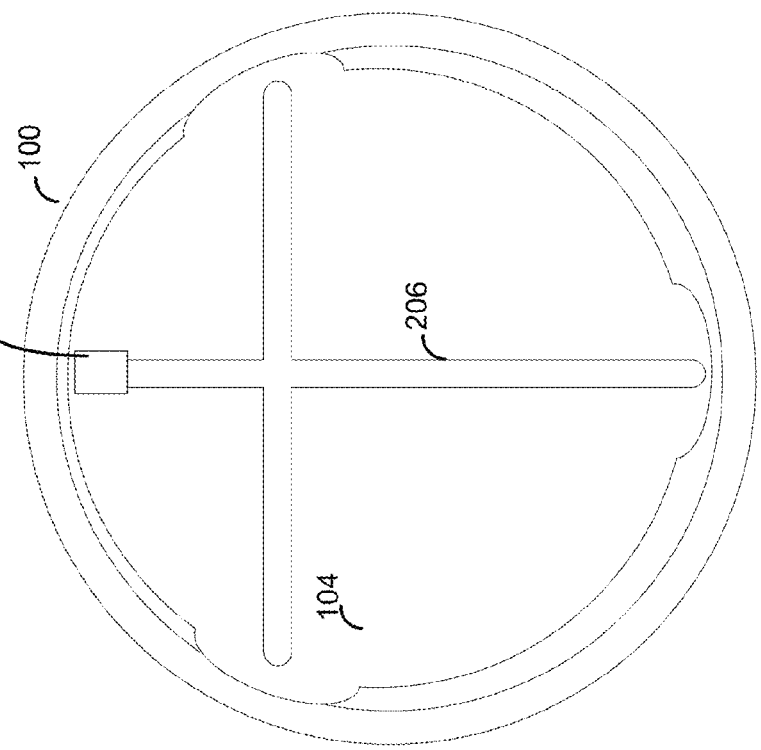
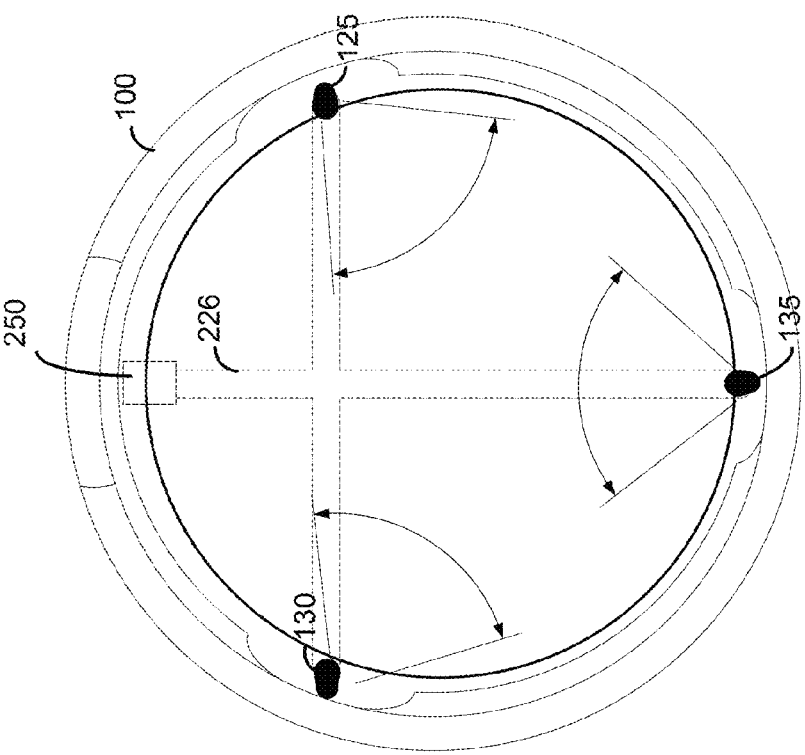

AUTO-FRESHENING WATER DISPENSER

BACKGROUND

Domesticated animals require nourishment and fresh water. Unfortunately, caretakers of such animals may not always remember to freshen a water supply for a pet. Numerous solutions have been devised which allow automation of feeding and watering pets. Each type of solution provides advantages for the caretaker.

SUMMARY

Technology is described for an automatic freshening water dispenser. The dispenser includes a bowl including a bottom and defined by a sidewall engaging the bottom and rising to a top edge. The sidewall having a first height between the bottom and the top edge and includes a recessed portion having a lower height. Three water inputs are positioned in the bowl Two water inputs positioned adjacent to the bottom of the bowl to eject water in a direction away from the recessed portion. A third water input is positioned in the sidewall at a location in the bowl opposing the recessed portion to eject water in a direction toward the recessed portion. A conduit couples the first, second and third water inputs to a water source connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 7 is a cross sectional, side views along the line A-A in FIG. 3 depicting the apparatus of FIG. 2

FIGS. 8a and 8b are cross sectional, side views along a line similar to A-A in FIG. 3 depicting alternative embodiments of the dispensing apparatus.

FIGS. 9 and 10 are a top view and bottom view, respectively, of another alternative embodiment of the present technology.

DETAILED DESCRIPTION

Technology is described which provides an automatically freshening water dispenser for myriad uses. In one embodiment, the automatically freshened water dispenser is coupled to an automated sprinkler system, and when the sprinkler system turns on, water is supplied to the dispenser. The dispenser contains water inlets in a bowl which are arranged to that flow patterns of water supplied by the water source (such as the sprinkler system) allow water to be continually flushed out of the dispenser as fresh water is input into the dispenser. The dispenser will be described herein with respects to a watering bowl for, for example, a dog or a pet. However, it should be understood that any number of different types of shapes of dispenser and arrangements of water inlets and supply conduits described herein, may be utilized within the scope of the present technology.

Figure 1:
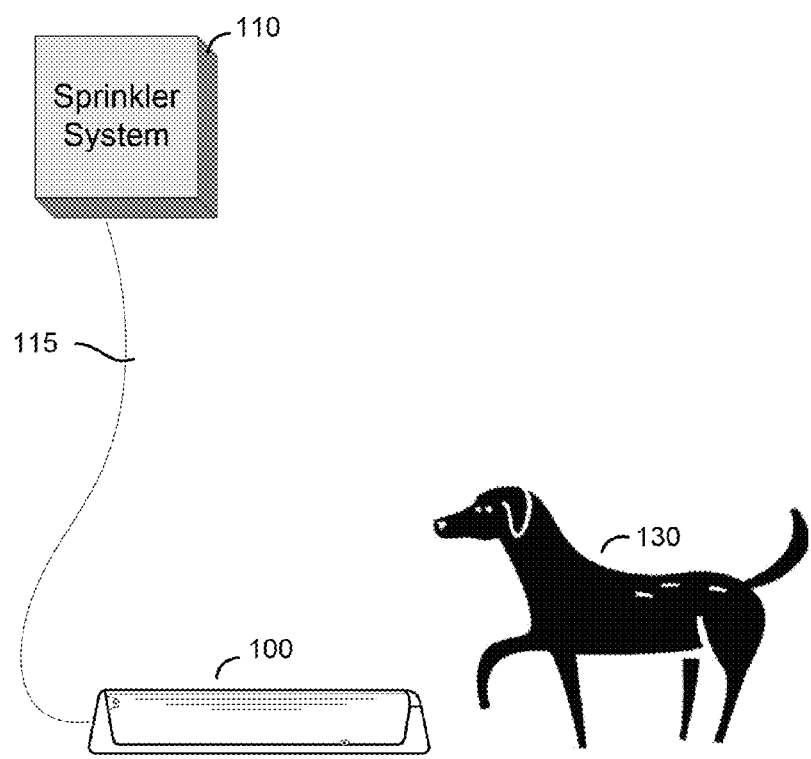
FIG. 1 is a block diagram depicting an exemplary user of a dispensing apparatus in accordance with the technology described herein.

FIG. 1 is a block diagram illustrating an exemplary usage of the dispenser 100. FIG. 1 illustrates a domesticated animal, such as a dog 130 at a dispensing dispenser 100. Dispensing apparatus is coupled by a conduit 115 to a sprinkler system 110. The sprinkler system may be any of a number of different types of sprinkler systems including automatic sprinkler systems or manually engaged sprinkler systems. Exemplary sprinkler systems of this type are manufactured by, for example, RainBird® Corporation, Azusa, Calif. and RainDrip®, Inc., Woodland Hills, Calif. For example, the RainDrip® automatic irrigation and sprinkler systems include a variety of spray heads, nozzles, timers, valves, conduits, and other materials which are utilized to create sprinkler and irrigation systems. In one embodiment, conduit 115 may comprise distribution tubing in quarter inch or one half inch diameter. Many irrigation systems are "automatic" in that they are set to irrigate and supply water based on a timer actuated a water valve. This automatic actuation of the water valve in an automated system supplies water to conduit 115. It should be understood that manually initiated water flow to a conduit 115 and to the dispenser 100 can also be used.

Figure 2:
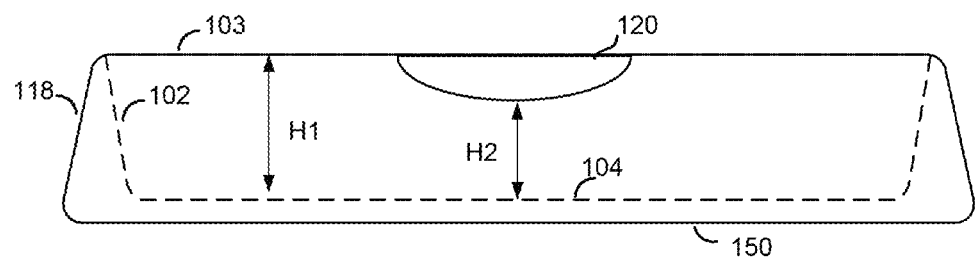
FIG. 2 is a side view of the dispensing apparatus.
Figure 3:
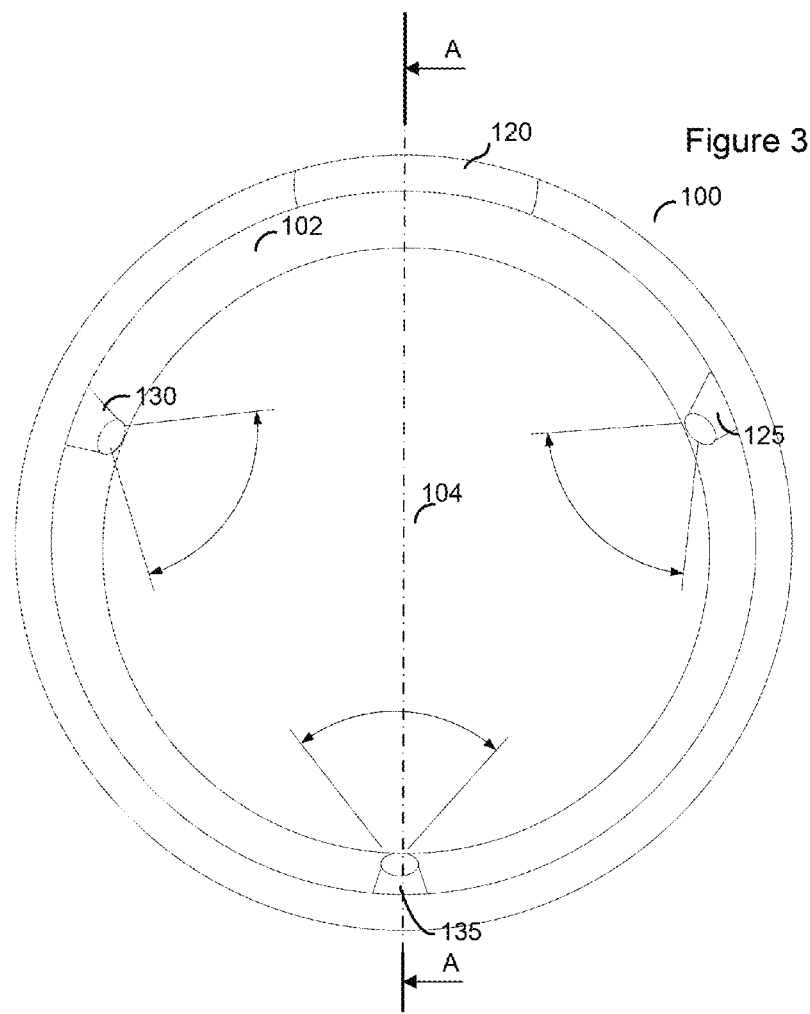
FIG. 3 is a top view of the dispensing apparatus.
Figure 4:
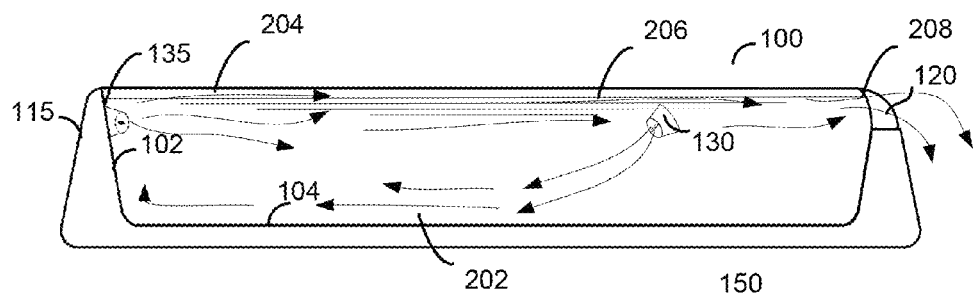
FIG. 4 is a side view and FIG. 5 is a top view depicting water flow patterns within the apparatus when a source of water is coupled to the apparatus.
Figure 5:
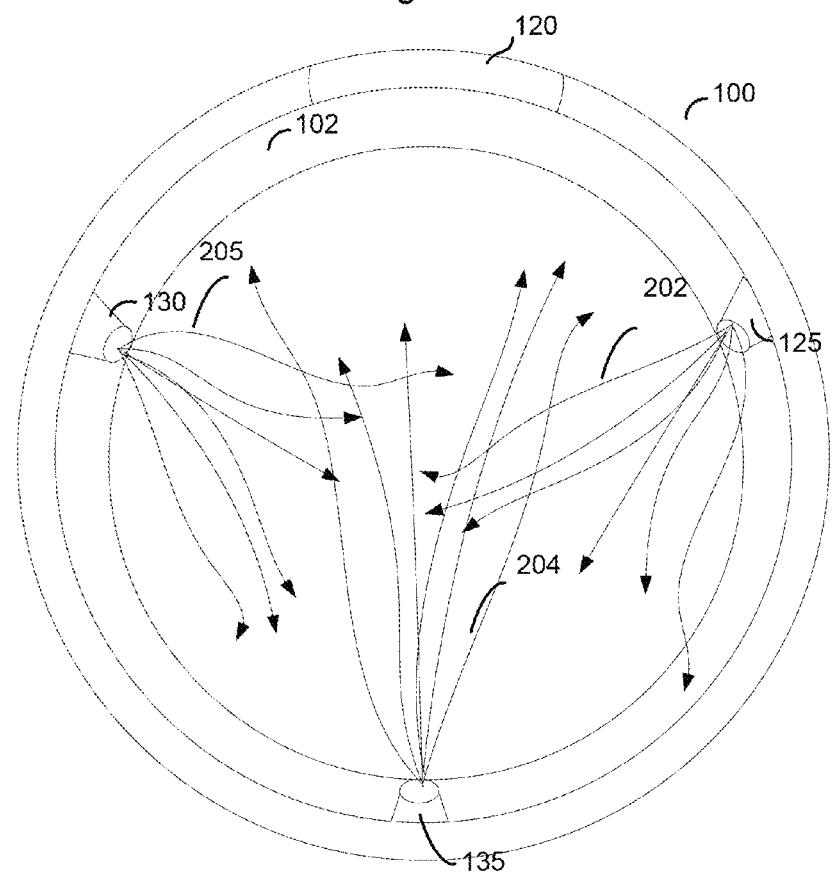

Dispenser 100 includes a bowl having a number of water inlets which spray water supplied by the water supply into the bowl and remove stagnant water from the bowl when a water supply is engaged. FIGS. 2 and 3 are a side view and top view, respectively, of dispenser 100. As illustrated in FIG. 2, dispenser 100 includes a bowl defined by a bottom 104, a side wall 102 which engages bottom 104 and has a top edge 103. Bottom 104 and top edge 103 define a height H1 throughout a major portion of the bowl, while recessed portion 120 defines a height H2 with respect to bottom 104. This lowered edge defined by recess 120 allows water to more easily escape dispenser 100. Top edge 103 joins wall 102 to exterior wall 118. Wall 118 has a bottom edge 150 which forms the support base for the dispenser 100. As described below, the water is encouraged by water inlets to exit at the recess 120. As illustrated in FIG. 3, three water inlets 125, 130 and 135 are provided. Water inlets may, in one embodiment, comprise quarter circle micro spray jets manufactured by Rain Drip Inc. These quarter circle micro spray jets provide a fan type spray which exits the inlets as illustrated in FIG. 3. Inlets 125, 130 and 135 are positioned approximately 120° apart; however, it should be understood that alternative spray arrangements may be utilized. Inlets 125, 130 and 135 may be installed or created to direct the fan type-flow (or other flows) in various directions from their installed locations. As illustrated in FIG. 4, inlets 125 and 130 are positioned adjacent to the top 104 of dispenser 100. As illustrated in FIG. 5, inlets 125 and 130 may be angled downward (only inlet 130 is illustrated) and toward inlet 135. Inlet 135 is positioned close to top edge 103 of the dispenser 100 and has an output directed toward recess 120.

FIGS. 4 and 5 illustrate a flow pattern of water when water is provided via conduit 115 into the dispenser 100 via inlets 125, 130, 135. As illustrated therein, flow exiting dispensers 125 and 130 provide flows 202 and 205, respectively, which push water along the base of the dispenser 100 adjacent to the bottom 104 and toward the inlet 135. When the flows 202 and 205 engage the portion of the walls below inlet 135, the flow is directed upward toward inlet 135. Flow 204 exiting inlet 135 pushes water in flows 204 and 206 along the top of the bowl so that it is forced out from recess 120 at 208. Thus, whenever water is supplied by the conduit 115, the circulation pattern as illustrated in FIGS. 4 and 5 will encourage water which is in the bottom of the bowl towards the top of the bowl and eventually out of the recess 120. This allows fresh water to be maintained within the dispenser 100 and is recycled each time the water supply is engaged.

Figure 6:
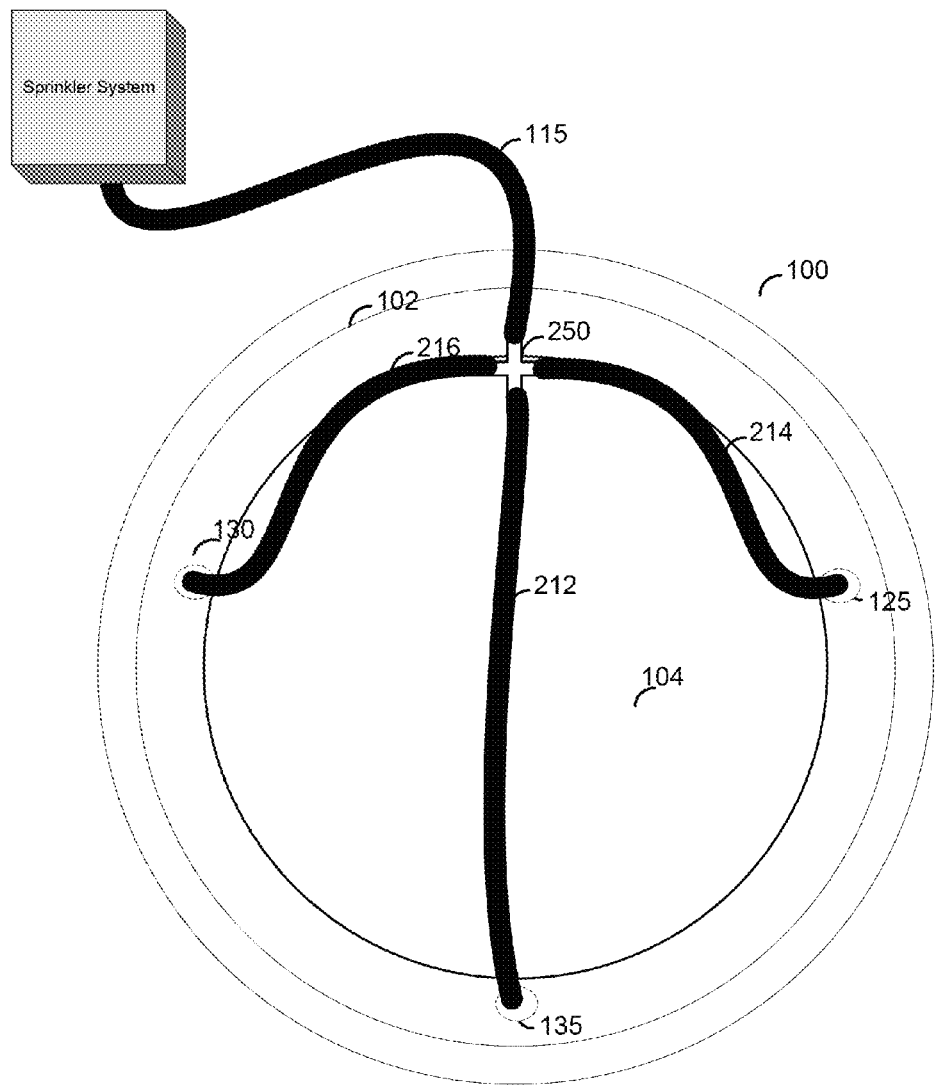
FIG. 6 is a bottom view depicting the conduit coupling the water inlets to a water source such as a sprinkler system.

FIG. 6 illustrates the coupling conduit 115 is coupled to each of the water inlets 125, 130 and 135. In one embodiment, conduit 115 is connected to a T-connector which may be a quarter-inch cross barbed connector and quarter-inch vinyl tubing, both manufactured by RainDrip®, may comprise the conduits 212, 214, and 216 which are coupled to each of the inlets 125, 130 and 135. Inlets 125, 130, 135 may comprise the quarter circle micro spray jets previously described. Alternatively, inlets may be molded into the wall or bottom of dispenser 100.

It should be recognized that the couplings and fittings may be assembled in accordance with the manufacturer's instructions provided by RainDrip Inc. Other types of water inlets and other types of connector tubing may also be utilized. Connector 250 may be directly coupled to conduct 115 and may have a secondary coupling or adapter attached thereto to allow various different types of conduits 115 to engage the dispenser 100.

FIG. 7 is a side view along Line A-A in FIG. 3 illustrating dispenser 100. As noted therein, inlet 135 is positioned closer to the top edge 103 of dispenser 100. FIG. 8a is a first alternative implementation of dispenser 100 illustrating positioning of the inlet 135A, and 130a adjacent to the bottom 104 of the dispenser 100. Inlet 125 could also be positioned adjacent to the bottom 104 in this embodiment. FIG. 8b is a second alternative implementation of dispenser 100 illustrating positioning of the inlet 135B adjacent to the top 104 of the dispenser 100, with inlets 125 and 130b positioned adjacent to the bottom of the dispenser. It should be further recognized that more or fewer water inlets may be used to induce water flows directing fresh water to the recessed portion 120.

FIGS. 9 and 10 illustrate another alternative embodiment of the dispenser 100. In this embodiment, the conduits 216 are molded into the base 104A of the dispenser 100. Plastic mold may be used to attach conduits 216 to the underside of the dispenser 100 and connect it to water inlets 125, 130, and 135. Water inlets may likewise be manufactured as horizontal, vertical, or other types of slits to allow a pressurized stream of water to exit each of the inlets and into the bowl to produce the flow patterns illustrated in FIGS. 4 and 5.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An automated water freshening apparatus, comprising:
    a bowl including an unbroken bottom surface, a sidewall engaging the bottom and rising to a top edge, the sidewall having a first height between the bottom and the top edge and including a recessed portion having a lower height;
    first and second water inputs positioned in the bowl below the top edge adjacent to the top of the bowl and configured to input water into the bowl in a direction toward and unimpeded along the bottom of the bowl and away from the recessed portion toward the third water input;
    the third water input positioned in the sidewall in the bowl below the top edge at a location in the bowl opposing the recessed portion and the first and second water inputs to input water into the bowl in a direction toward the recessed portion and in a flow adjacent to the top edge; and
    a conduit coupling the first, second and third water inputs to a water source connection.

2. The apparatus of claim 1 wherein teach of the first, second, and third water inputs provide a one-quarter circle fan output stream into the bowl.

3. The apparatus of claim 1 wherein the bowl is circular.

4. The apparatus of claim 1 wherein the first, second and third inputs are positioned approximately equidistantly apart.

5. The apparatus of claim 1 wherein the conduit comprises a one-quarter inch plastic tube coupled by a t-fitting.

6. The apparatus of claim 1 wherein the conduit is formed into the bottom of the bowl.

7. The apparatus of claim 1 wherein all inputs are positioned adjacent to the bottom.

8. The apparatus of claim 1 wherein each input is molded into the bowl.

9. The apparatus of claim 1 wherein the apparatus is coupled to an automated sprinkler system.

10. An water dispenser, comprising:
    a circular bowl having an uninterrupted bottom surface and an interior wall defining a circumference having a first height defined by a top edge;
    a recessed portion in the bowl, the interior wall having a lower height than the top edge at the recessed portion;
    first, second and third water inputs positioned approximately equidistantly in and about the circumference of the bowl, said first and second inputs positioned on either side of the recessed portion and adjacent to the top edge, the first and second inputs configured to input water into the bowl in a direction away from the recessed portion and toward and unimpeded along the bottom of the bowl in a direction toward the third water input, the third water input positioned opposing the recessed portion and configured to input water into the bowl in a direction toward the recessed portion opposing the direction of the flow of the first and second inputs in a flow adjacent to the top edge; and
    a conduit coupling the first, second and third water inputs to a water source connection.

11. The dispenser of claim 10 wherein each of the first, second and third water inputs provide a one-quarter circle fan output stream.

12. The dispenser of claim 11 wherein the first, second and third inputs are sprinkler head fittings.

13. The dispenser of claim 10 wherein the conduit comprises a one-quarter inch plastic tube coupled by a t-fitting.

14. The dispenser of claim 10 wherein the conduit is formed into the bottom of the bowl.

15. The dispenser of claim 10 wherein each input is positioned adjacent the top edge and the first and second inputs are angled downward toward the bottom of the bowl.

16. The dispenser of claim 10 wherein the inputs are fixtures mounted in the bowl.

17. The dispenser of claim 10 wherein the apparatus is coupled to an automated sprinkler system.

* * * * *